United States Patent Office 3,367,931
Patented Feb. 6, 1968

3,367,931
1-(2-HYDROXY-3-METHOXYPROPYL)-3-(5-NITROFURFURYLIDENEAMINO)-2-IMIDAZOLIDINONE
Harry Raymond Snyder, Jr., Norwich, N.Y., assignor to The Norwich Pharmacal Company, a corporation of New York
No Drawing. Filed Mar. 8, 1965, Ser. No. 438,085
1 Claim. (Cl. 260—240)

ABSTRACT OF THE DISCLOSURE

Antibacterially active new 1-(2-hydroxy-3-methoxypropyl)-3-(5-nitrofurfurylideneamino)-2-imidazolidinone.

This invention relates to the new chemical compound of the formula:

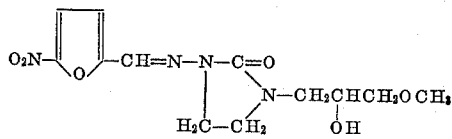

and to its preparation.

This compound is inimical in very small amounts of the order of 3–12.5 µg./ml. in aqueous media to the growth of bacteria such as *Escherichia coli, Salmonella typhosa, Staphylococcus aureus, Streptococcus agalactiae,* and the like. It is thus useful as a bactericide. Furthermore, upon peroral administration in doses ranging from 50–100 mg./kg./day to animals lethally infected with organisms such as *Salmonella typhosa, Staphylococcus aureus* or *Escherichia coli,* protection against mortality is secured. In addition, when administered perorally to animals such as rats in a dose of about 10 mg./kg., this compound resists metabolic destruction and is excreted in the urine at a level of about 20–25% of the administered quantity, making it a valuable urinary tract disinfectant.

The compound of this invention may be readily prepared. It is currently preferred to cyclize N-(2-hydroxy-3-methoxypropyl)ethylenediamine by reaction with urea; nitrosate the resultant cyclic urea; reduce the nitroso compound; and condense the amino compound with 5-nitrofurfural to obtain it in a good yield.

The compound of this invention may be readily formulated in suitable dosage units such as tablets, suspensions, elixirs, capsules, lozenges and the like, using excipients and adjuvants common in the art of compounding.

In order that this invention may be readily understood by and available to those skilled in the art, the following illustrative example is supplied:

1-(2-hydroxy-3-methoxypropyl)-3-(5-nitrofurfurylideneamino)-2-imidazolidinone

A.—N-(2-hydroxy-3-methoxypropyl)ethylenediamine

The above compound (125 g., 0.845 mole) is placed in a flask with urea (60 g., 1 mole). The mixture is heated to 230° C. over a three-hour period. Upon cooling, there is obtained the cyclic urea in a yield of 147 g. (100%), which may be used directly in the next step.

B.—The urea is dissolved in 3–1 of 10% sulfuric acid cooled to 5° C. To this cooled solution is added sodium nitrite (69 g., 1 mole) at such a rate as to maintain a temperature of 5° C. After stirring at 0–5° for two hours, zinc dust (130 g., 2 moles) is added over a period of 1 hour at <20° C. The mixture is stirred, without cooling, for two hours and then filtered. The filtrate is treated with 5-nitrofurfural (112 g., 0.8 mole) dissolved in 800 ml. of ethanol. The title product is filtered, rinsed with ethanol-ether and dried at 60° C. to yield 202 g. (65%), M.P. 172–174° C. (corr.).

This may be recrystallized from nitromethane, if desired.

*Analysis.*—Calcd. for $C_{12}H_{16}N_4O_6$: C, 46.15; H, 5.16; N, 17.94. Found: C, 46.17; H, 5.06; N, 17.89.

What is claimed is:
1. The compound of the formula:

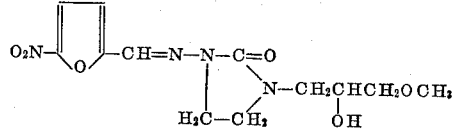

References Cited

UNITED STATES PATENTS 3,254,075    5/1966    Ebetino _____ 260—240

JOHN D. RANDOLPH, *Primary Examiner.*